(12) United States Patent
Sawada

(10) Patent No.: US 11,183,794 B2
(45) Date of Patent: Nov. 23, 2021

(54) CONNECTOR STRUCTURE AND POWER STORAGE DEVICE

(71) Applicant: Panasonic Intellectual Property Management Co., Ltd., Osaka (JP)

(72) Inventor: Koichi Sawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 307 days.

(21) Appl. No.: 16/326,066

(22) PCT Filed: Oct. 23, 2017

(86) PCT No.: PCT/JP2017/038112
§ 371 (c)(1),
(2) Date: Feb. 15, 2019

(87) PCT Pub. No.: WO2018/079460
PCT Pub. Date: May 3, 2018

(65) Prior Publication Data
US 2019/0190203 A1      Jun. 20, 2019

(30) Foreign Application Priority Data
Oct. 28, 2016   (JP) ............................. JP2016-211355

(51) Int. Cl.
*H01R 13/631* (2006.01)
*H01M 10/613* (2014.01)
(Continued)

(52) U.S. Cl.
CPC ........ *H01R 13/631* (2013.01); *H01M 10/613* (2015.04); *H01M 10/63* (2015.04);
(Continued)

(58) Field of Classification Search
CPC .. H01M 10/425; H01M 10/613; H01M 10/63; H01M 10/6563; H01M 50/20; H01M 50/528; H01R 13/631; H01R 13/6315
See application file for complete search history.

(56) References Cited

U.S. PATENT DOCUMENTS

| 4,853,830 A | 8/1989 | Corfits et al. |
| 2014/0308557 A1 | 10/2014 | Ebisawa et al. |

(Continued)

FOREIGN PATENT DOCUMENTS

| CN | 103403978 A | 11/2013 |
| JP | 1-282897 | 11/1989 |

(Continued)

OTHER PUBLICATIONS

International Search Report of PCT application No. PCT/JP2017/038112 dated Jan. 9, 2018.

(Continued)

*Primary Examiner* — Adam A Arciero
(74) *Attorney, Agent, or Firm* — McDermott Will and Emery LLP

(57) ABSTRACT

A connector structure has a first connector unit including a first connector and a first terminal, and a second connector unit including a second connector and a second terminal. The second connector unit has a locating pin and an insertion hole into which the locating pin is inserted. In the connector structure, the first connector and the first terminal, and the second connector and the second terminal are brought into a connectible state when the locating pin is inserted into the insertion hole.

14 Claims, 7 Drawing Sheets

(51) Int. Cl.
  *H01M 10/6563* (2014.01)
  *H01M 10/63* (2014.01)
  *H01M 50/20* (2021.01)
  *H01M 50/528* (2021.01)

(52) U.S. Cl.
  CPC ....... *H01M 10/6563* (2015.04); *H01M 50/20* (2021.01); *H01M 50/528* (2021.01); *H01R 13/6315* (2013.01)

(56) References Cited

U.S. PATENT DOCUMENTS

| | | | | |
|---|---|---|---|---|
| 2015/0244035 A1* | 8/2015 | Yokoyama | ............ | H01M 50/20 429/71 |
| 2015/0333303 A1 | 11/2015 | Hachiya et al. | | |
| 2015/0333446 A1 | 11/2015 | Yuan et al. | | |

FOREIGN PATENT DOCUMENTS

| | | |
|---|---|---|
| JP | 4-129178 | 4/1992 |
| JP | 2008-276991 | 11/2008 |
| JP | 2013-140710 | 7/2013 |
| WO | 2014/073544 | 5/2014 |

OTHER PUBLICATIONS

English Translation of Chinese Search Report dated Apr. 26, 2020 for the related Chinese Patent Application No. 201780050678.2.

\* cited by examiner

US 11,183,794 B2

CONNECTOR STRUCTURE AND POWER STORAGE DEVICE

CROSS-REFERENCE TO RELATED APPLICATIONS

This application is a U.S. national stage application of the PCT International Application No. PCT/JP2017/038112 filed on Oct. 23, 2017, which claims the benefit of foreign priority of Japanese patent application No. 2016-211355 filed on Oct. 28, 2016, the contents all of which are incorporated herein by reference.

TECHNICAL FIELD

The present disclosure relates to a connector structure and a power storage device.

BACKGROUND ART

PTL 1 discloses a connector structure in which at least one of a male connector and a female connector is pressed in an insertion and extraction direction under an elastic force of a spring to prevent occurrence of fretting corrosion at an electrical contact part. PTL 2 discloses a power storage device equipped with a plurality of connectors that have a floating allowance in a plane intersecting with a direction in which a battery unit is inserted into a battery unit container.

CITATION LIST

Patent Literature

PTL 1: Unexamined Japanese Patent Publication No. 2008-276991

PTL 2: Unexamined Japanese Patent Publication No. 2013-140710

SUMMARY OF THE INVENTION

If two objects to be connected by connectors have pluralities of connectors on their respective surfaces facing each other, putting the facing connectors into proper alignment is presumably difficult, resulting in failure to properly connect the facing connectors with each other. For example, if objects are to be connected with each other by connectors in two pairs, connection by the connectors in one of the pairs may be unsatisfactory.

A connector structure according to the present disclosure is configured to electrically connect a connector disposed on a panel with an electric device. The connector structure includes a first connector unit and a second connector unit. The first connector unit includes a first connector disposed on the panel and a first terminal disposed on a side surface of the electric device facing the panel. The first terminal is configured to be connected with the first connector. The second connector unit includes a second connector disposed at a distance from the first connector on the panel and a second terminal disposed at a distance from the first terminal on the side surface of the electric device. The second terminal is configured to be connected with the second connector. The second connector unit has a locating pin being disposed on the panel and extending toward the side surface of the electric device longer than the second connector does and an insertion hole for the locating pin, the insertion hole being formed in the side surface of the electric device. The first connector and the first terminal, and the second connector and the second terminal are brought into a connectible state when the locating pin is inserted into the insertion hole.

A power storage device according to the present disclosure has the connector structure described above.

The connector structure according to the present disclosure enables pluralities of connectors disposed on facing surfaces of two respective objects to be connected with each other swiftly and reliably.

DESCRIPTION OF EMBODIMENT

Figure 1:
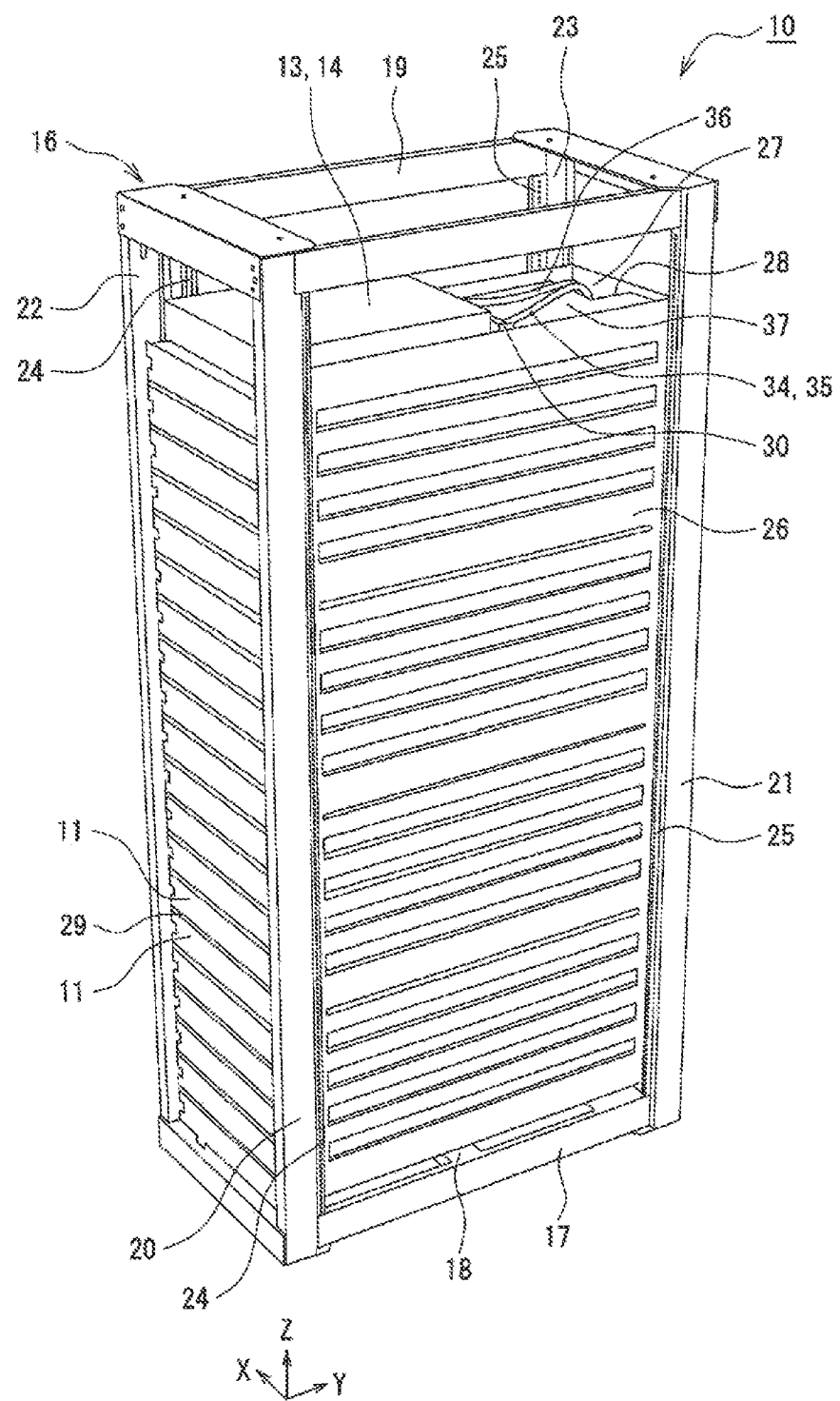
FIG. 1 is a front perspective view of a power storage device according to an example of an exemplary embodiment.

As described above, if two objects to be connected by connectors have pluralities of connectors on their respective surfaces facing each other, putting the facing connectors into proper alignment may be difficult, resulting in failure to properly connect the facing connectors with each other. In particular, if connectors have to be connected in a situation in which positions of the connectors cannot be visually checked, it is not easy to connect the connectors swiftly and reliably. A connector structure according to the present disclosure, developed in light of the situation above, enables pluralities of connectors disposed on facing surfaces of two respective objects to be connected with each other swiftly and reliably.

The connector structure according to the present disclosure includes a first connector unit that includes a first connector on a panel and a first terminal on a device, and a second connector unit that includes a second connector on the panel and a second terminal on the device. The second connector unit has a locating pin and an insertion hole for the locating pin. A first connector section made up of the first connector and the first terminal and a second connector section made up of the second connector and the second terminal are brought into a connectible state when the locating pin is inserted into the insertion hole. In other words, while the locating pin is not inserted into the insertion hole, each of the connector sections is not connected. This prevents connection failures including a situation in which the second connector section is not connected while the first connector division is connected.

The locating pin is inserted into the insertion hole before the connector sections are each connected. When the locating pin is inserted into the insertion hole, proper alignment of the connector sections is automatically completed. In other words, this structure does not require work for proper alignment of a plurality of connector sections as long as proper alignment of the locating pin and the insertion hole is achieved. As a result, the connector structure according to the present disclosure, if applied, enables pluralities of connectors to be connected with each other swiftly and reliably even if positions of the connectors cannot be visually checked.

An example of an exemplary embodiment will now be described in detail with reference to the attached drawings.

Drawings referred to in the exemplary embodiment are schematically drawn, and thus dimensions of configuration elements illustrated in the drawings should be understood in view of the following description. In the description herein, "substantially identical" means absolutely identical, as well as virtually identical, for example. Other words modified by "substantially" should be interpreted in the same manner. It is initially envisaged that an exemplary embodiment can be made by suitably combining some elements in any of the exemplary embodiment and modifications thereof described hereinafter.

For the convenience of description, hereinafter, a direction of arrow X indicating a horizontal direction in FIG. 1 and other figures is referred to as a "lateral direction", a horizontal direction of arrow Y orthogonal to the direction of arrow X is referred to as a "front-rear direction", and a direction of arrow Z orthogonal to arrows X and Y is referred to as a "vertical direction" or a "height direction". In the present exemplary embodiment, the front-rear direction is an insertion and extraction direction of connectors and terminals that form connector sections, and the lateral direction is a direction orthogonal to both the insertion and extraction direction and the vertical direction.

The description hereinafter illustrates power storage device 10 including connector structure 1 as an example of the exemplary embodiment. However, application of the connector structure according to the present disclosure is not limited to power storage devices. The connector structure according to the present disclosure can be applied to connections between various electric devices. Connector panel 30 fixed to rack 16 in power storage device 10 is exemplified as a panel according to the present disclosure. However, the panel is not limited to this example. The panel according to the present disclosure may be a panel that constitutes a housing of a battery module or a panel that constitutes a housing of another electric device, for example.

Figure 2:
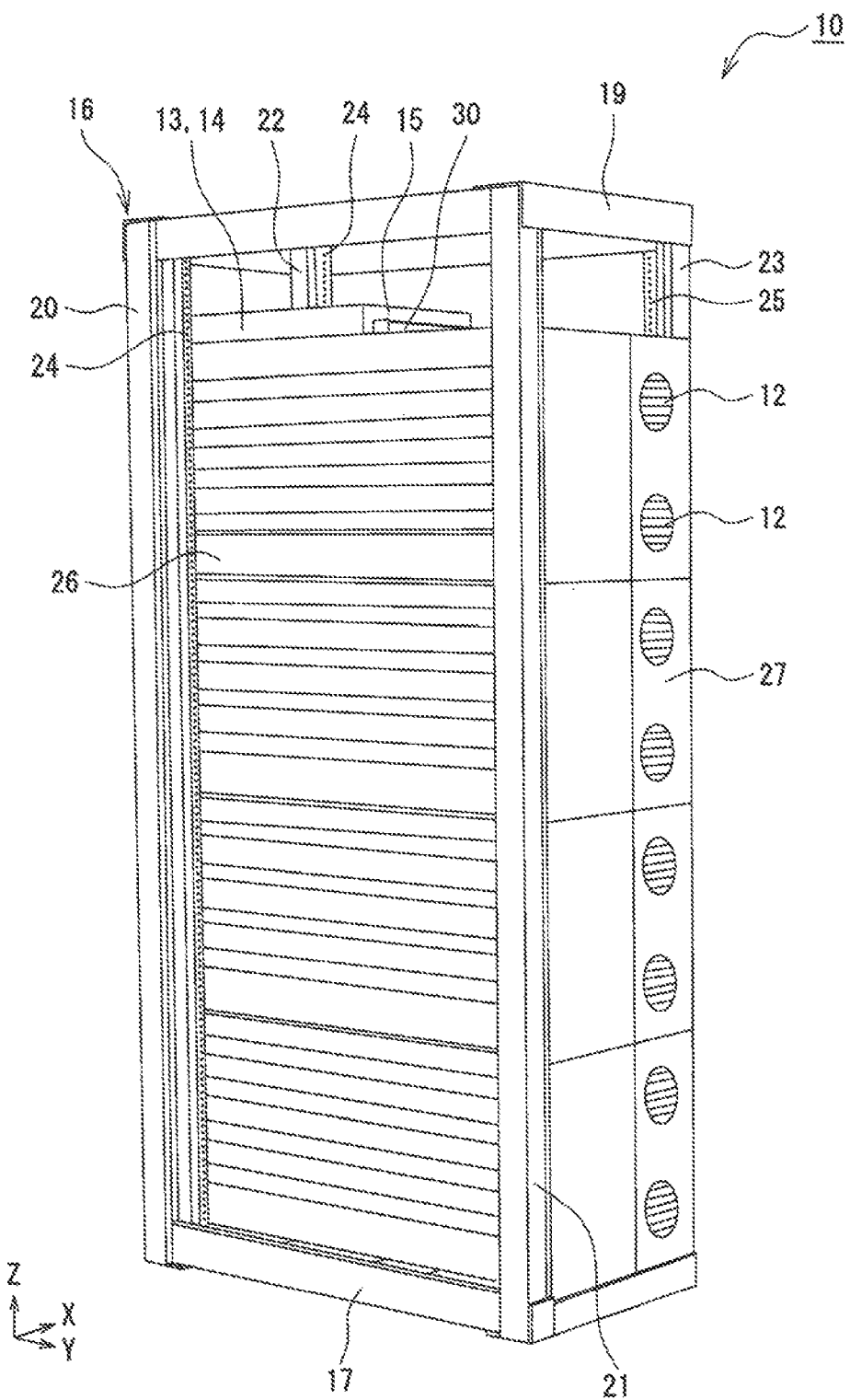
FIG. 2 is a rear perspective view of a power storage device according to an example of an exemplary embodiment.

FIG. 1 is a front perspective view of power storage device 10 according to an example of the exemplary embodiment. FIG. 2 is a rear perspective view of power storage device 10. As illustrated in FIGS. 1 and 2, power storage device 10 includes a plurality of battery modules 11, fans 12 to cool battery modules 11, and controller 13 to control battery modules 11 and fans 12. Power storage device 10 has connector panel 30 on which first connector 41 and second connector 51 (refer to FIG. 3 and other figures described later) are disposed.

As described in detail later, electric cables connected to battery modules 11 and fans 12 are connected to the above-described connectors on connector panel 30. The electric cables provided in the present exemplary embodiment are power cable 34, signal cable 35, and fan cable 36. Connector structure 1 (refer to FIG. 3 and other figures described later) is configured to electrically connect the connectors on connector panel 30 with terminals on controller 13. A connector structure may be configured to electrically connect a plurality of connectors disposed on a panel with a battery module.

Power storage device 10 has rack 16 to contain and arrange the plurality of battery modules 11. In the present exemplary embodiment, connector panel 30 is fixed to rack 16. Preferably, connector panel 30 is fixed to rack 16 such that the electric cables connected to the connectors extend toward a rear of rack 16. In this case, controller 13 is disposed closer to the front of power storage device 10 than connector panel 30 is. For example, a plurality of power storage devices 10 are disposed side by side indoors. The front of power storage device 10 is, for example, a side facing a passage. A rear of the power storage device is a side remote from the passage.

Battery module 11 contained in rack 16 includes a flat case with a substantially rectangular top surface that is long in the front-rear direction. The case is a metal- or resin-made housing, for example. The case contains a plurality of single batteries, for example. Generally, single batteries are contained in a battery block. Battery module 11 has a plurality of battery blocks. Preferable examples of the single batteries include lithium ion secondary batteries. Battery module 11 may have a control circuit board inside the case to provide functions such as controlling electric power input into or output from the module and monitoring the condition of the batteries.

Gap 29 having an opening at a front of rack 16 is formed between battery modules 11 contained in rack 16. Both sides of gap 29 in the lateral direction are closed with side panels 26 described later. Gap 29 functions as a cooling channel through which air flows from the front of rack 16 after being drawn in by action of fan 12. Air introduced from the front flows rearward through gap 29 and is discharged from an opening (a part to which fan 12 is attached) in back panel 27 described later. In this way, each battery module 11 is cooled by air flowing along the top surface and a bottom surface of battery module 11.

Rack 16 includes bottom frame 17, ceiling frame 19, and four props 20, 21, 22, 23. Rack 16 may be, for example, a standard rack such as a 19-inch rack. Preferably, rack 16 has sufficient strength to withstand even when many heavy battery modules 11 are contained in rack 16, and is ideally made of steel, for example. In the example shown in FIG. 1, rack 16 contains 20 battery modules 11 arranged in the vertical direction. A number of battery modules 11 contained in one rack 16 is not limited to this example.

Bottom frame 17 and ceiling frame 19 are rectangular frames. Bottom frame 17 may be made up of four bottom frame parts that are coupled together with fasteners such as bolts, or may be integrated and formed in advance. Reinforcing frame part 18 may be disposed across a middle of bottom frame 17 along the lateral direction of rack 16. Both ends of reinforcing frame part 18 are coupled to bottom frame 17 with fasteners such as bolts.

Similar to bottom frame 17, ceiling frame 19 may be made up of four bottom frame parts that are coupled together with fasteners such as screws or bolts, or may be integrated and formed in advance. The present exemplary embodiment shows ceiling frame 19 that includes no ceiling plate. However, a configuration of the ceiling frame is not limited to this example. A ceiling plate may be disposed as a separate component or may be integrated with ceiling frame 19 to close a top face of ceiling frame 19 and reduce deposition of dust and the like. Similar to bottom frame 17, ceiling frame 19 may have a reinforcing frame part across its middle to enhance frame structure strength.

Props 20, 21, 22, 23 stand at four corners of bottom frame 17 and ceiling frame 19. Props 20, 21, 22, 23 are long components extending along the vertical direction. Bottom ends and top ends of props 20, 21, 22, 23 are fastened to bottom frame 17 and ceiling frame 19 respectively with fasteners such as screws or bolts, for example. Bottom frame 17, ceiling frame 19, and four props 20, 21, 22, 23 constitute a frame structure of rack 16.

Out of props 20, 21, 22, 23, two props 20, 22 located at the front of rack 16 have many attachment holes 24 formed at predetermined intervals along the vertical direction. Similarly, two props 21, 23 located at the rear of rack 16 have many attachment holes 25 formed at predetermined intervals along the vertical direction. In the description given hereinafter, props 20, 22 may be referred to as front props, and props 21, 23 may be referred to as rear props.

Side panels 26 are attached to rack 16. Side panel 26 is, for example, attached to one side face of rack 16 in the lateral direction such that a front end of side panel 26 is fixed to attachment holes 24 of front prop 20 with screws or the like and a rear end of side panel 26 is fixed to attachment holes 25 of rear prop 21 with screws or the like. Other side panel 26 is attached to the other side face of rack 16 in the lateral direction. Side panels 26 may be each divided into a plurality of parts.

Side panel 26 is formed of a metallic plate, for example, and has a support (not shown) that is bent horizontally so as to project toward an inside of rack 16. Side panels 26 forming the two side faces of rack 16 in the lateral direction are disposed such that their respective supports project at an identical level. Thus, if each battery module 11 and controller 13 are inserted into rack 16 from the front of rack 16 and placed on the two supports at both sides in the lateral direction, battery modules 11 each having a flat rectangular parallelepiped shape are contained and put in a horizontal position. Preferably, battery modules 11 contained in rack 16 are fixed to side panels 26, the props, or the like.

Back panel 27 is attached to rack 16. Similar to side panels 26, back panel 27 is formed of a metallic plate, for example. Back panel 27 may be partly made of a resin. Back panel 27 is, for example, attached to rear ends of side panels 26 or rear props 21, 23 with screws or the like. Fan 12 is attached to back panel 27. Preferably, a plurality of fans 12 are arranged on back panel 27 in the vertical direction of rack 16. Back panel 27 may be divided into a plurality of parts, and may be, for example, made up of different parts, i.e. a component at one side in the lateral direction and a component to which fans 12 are attached at the other side in the lateral direction.

Duct space 28 extending in the vertical direction is provided between back panel 27 and battery modules 11. Duct space 28 is, for example, a space enclosed by battery modules 11, side panels 26, and back panel 27. Duct space 28 is a discharge channel for air drawn in from the front of power storage device 10. Air flowing through duct space 28 is discharged by fans 12 to an outside of power storage device 10. The electric cables connected to the connectors on connector panel 30 are routed in duct space 28.

Each battery module 11 is provided with a plurality of terminals on its side surface facing duct space 28. The terminals are connected to the single batteries and sensors such as a voltage sensor, a current sensor, and a temperature sensor contained in the case of battery module 11, for example. A panel may be disposed between battery modules 11 and duct space 28 to define a wall surface of duct space 28. In this case, the plurality of terminals are disposed on the panel. Power cable 34 and signal cable 35 are connected to the respective terminals. Through power cable 34, the terminals are connected in series between adjacent battery modules 11, for example. Fans 12 are provided with terminals, and the terminals are connected to fan cable 36 in duct space 28.

Controller 13 and connector panel 30 are disposed in an upper part of power storage device 10. Power cable 34 and other electric cables drawn from an upper opening of duct space 28 are electrically connected with controller 13 via connector panel 30. This enables controller 13 to control input and output of electric power for each battery module 11, for example. This also enables the controller to control the supply of electric power to fans 12 and operation of fans 12.

Figure 3:
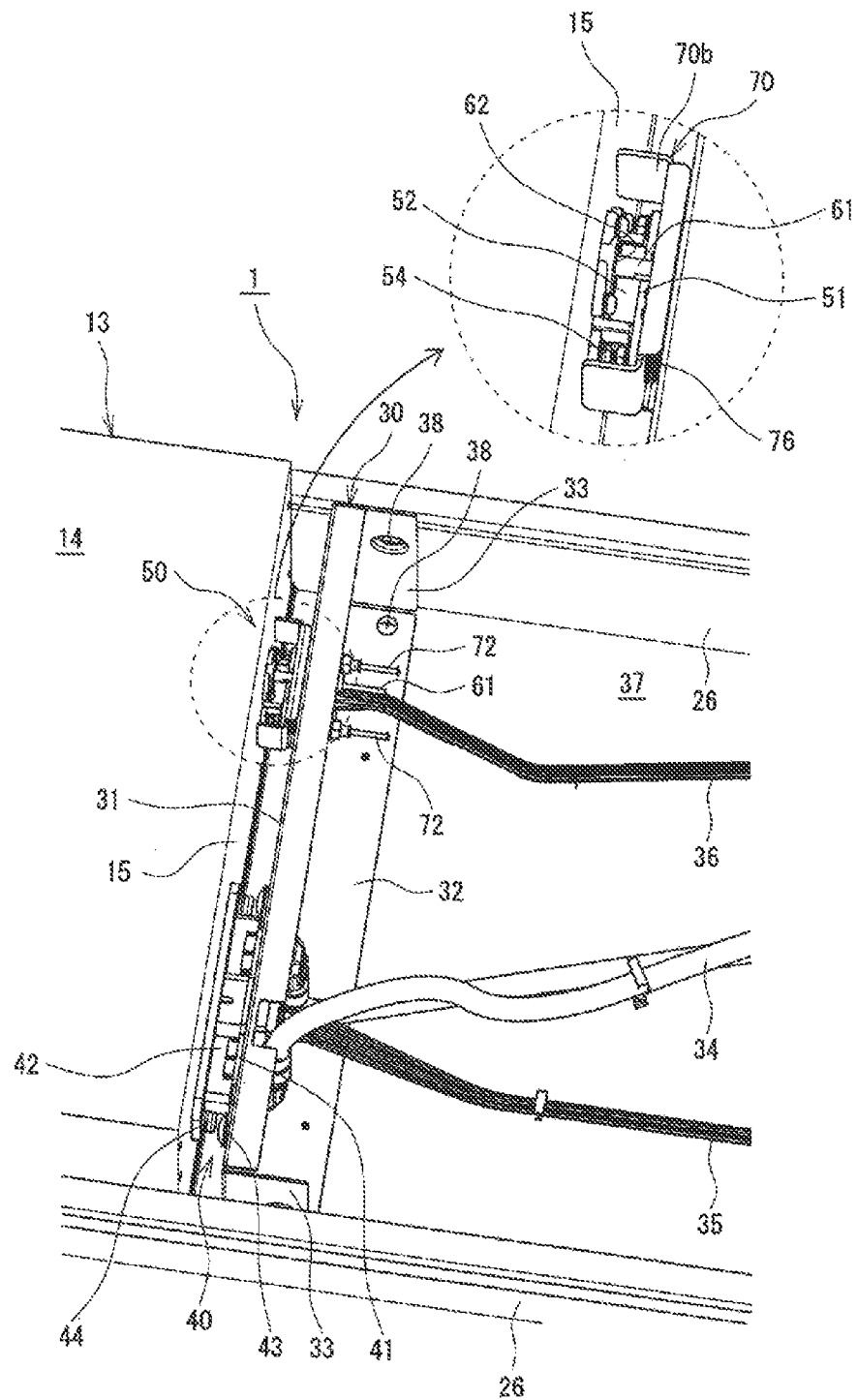
FIG. 3 is a perspective view of a connector structure as viewed from above a power storage device, according to an example of an exemplary embodiment.
Figure 4:
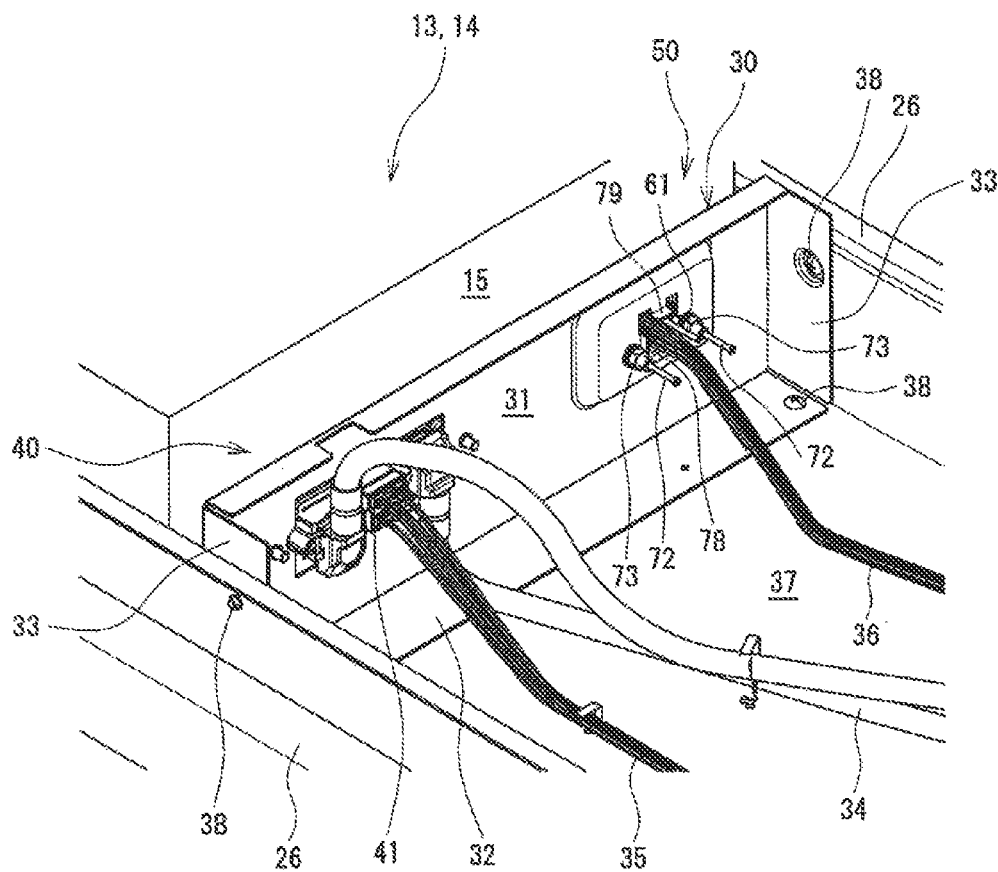
FIG. 4 is a perspective view of a connector structure as viewed from behind a power storage device, according to an example of an exemplary embodiment.

With reference to FIGS. 3 to 7C, connector structure 1 configured to electrically connect the connectors on connector panel 30 with the terminals on controller 13 will now be described in detail. FIG. 3 is a perspective view of connector structure 1 as viewed from above power storage device 10. FIG. 4 is a perspective view of connector structure 1 as viewed from behind power storage device 10.

As illustrated in FIG. 3, controller 13 and connector panel 30, which are electrically connected with each other by connector structure 1, are disposed on base panel 37 fixed to an upper part of rack 16. Controller 13 and connector panel 30 may be placed on the top surface of battery module 11 contained in an uppermost section of rack 16. However, it is preferable that these components are disposed on base panel 37 that is put on the supports of side panels 26 and fixed to side panels 26 or the like. In the present exemplary embodiment, connector panel 30 is disposed at a middle of rack 16 in the front-rear direction.

Connector panel 30 is formed of a metallic plate, for example, and includes substantially rectangular main wall 31 standing on base panel 37 and extending in the lateral direction of rack 16 and fixing part 32 extending rearward from a lower end of main wall 31 along base panel 37. Connector panel 30 further includes fixing parts 33 extending rearward from both lateral ends of main wall 31 along side panels 26. In the example shown in FIG. 3, connector panel 30 is fixed to rack 16 by fixing fixing part 32 to base panel 37 and fixing parts 33 to side panels 26 with screws 38. Connector panel 30 and side surface 15 of controller 13 face each other through a gap such that main wall 31 and side surface 15 are substantially parallel to each other.

Connector panel 30 has first connector 41 that is connected to power cable 34 and signal cable 35 and second connector 51 that is connected to fan cable 36. First and second connectors 41 and 51 being distant from each other in the lateral direction (a width direction) of rack 16 are disposed on main wall 31 of connector panel 30. Power cable 34, signal cable 35, and fan cable 36 extend from connector panel 30 toward the rear of rack 16 and are inserted into duct space 28 (refer to FIG. 1).

Connector structure 1 has first connector unit 40 and second connector unit 50. First connector unit 40 includes first connector 41 disposed on connector panel 30 and first terminal 42 disposed on side surface 15 of case 14 of controller 13 facing connector panel 30. Second connector unit 50 includes second connector 51 disposed at a distance from first connector 41 on connector panel 30 and second terminal 52 disposed at a distance from first terminal 42 on side surface 15.

As illustrated in FIGS. 3 and 4, first connector 41, i.e. a component of first connector unit 40, is a male connector, for example, and is fitted into a through hole formed in one side of main wall 31 of connector panel 30 in the lateral direction. In consideration of floating allowance described later, the through hole is formed slightly larger than first connector 41. First connector 41 is fixed to main wall 31 with screws 43.

First terminal 42, i.e. a component of first connector unit 40, is a female connector that engages with first connector 41, for example, and is fitted into a through hole formed in one side of side surface 15 of controller 13, which faces main wall 31, in the lateral direction. In consideration of floating allowance described later, the through hole is formed slightly larger than first terminal 42. First terminal 42 is fixed to side surface 15 with screws 44.

Second connector 51, i.e. a component of second connector unit 50, is a male connector, for example, and is disposed on base 70 in the other side of main wall 31 of connector panel 30 in the lateral direction. Base 70 is a component that is supported by support pin 72 so as to be movable in the front-rear direction. Base 70 is disposed over a front surface of main wall 31 facing side surface 15 of controller 13. Base 70 and support pin 72 will be detailed later. Fan cable 36 is inserted into opening 78 formed in main wall 31 and is connected to second connector 51.

Second terminal 52, i.e. a component of second connector unit 50, is a female connector that engages with second connector 51, for example, and is fitted into a through hole formed in the other side of side surface 15 of controller 13 in the lateral direction. In consideration of floating allowance described later, the through hole is formed slightly larger than second terminal 52. Second terminal 52 is fixed to side surface 15 with screws 54.

In the present exemplary embodiment, male connectors are used for first and second connectors 41 and 51, and female connectors are used for first and second terminals 42 and 52. However, the first and the second connectors may be female connectors, and the first and the second terminals may be male connectors. Alternatively, first connector 41 may be a male connector, and second connector 51 may be a female connector (in this case, first terminal 42 is a female connector, and second terminal 52 is a male connector), or vice versa.

Connecting the above-described connectors to the terminals to form connector structure 1 involves moving controller 13 provided with the terminals, for example. As described above, connector panel 30 disposed at the middle of rack 16 in the front-rear direction is fixed to side panels 26 and base panel 37, with first and second connectors 41 and 51 arranged in the lateral direction. In the present exemplary embodiment, with connector panel 30 fixed to rack 16, controller 13 is inserted into rack 16 from the front of rack 16 so that the terminals on controller 13 are connected to the connectors on connector panel 30. In this case, the connectors have to be connected without being visually checked. Nevertheless, as described in detail later, connector structure 1 includes locating pin 61 and insertion hole 62 and hence enables connection of a plurality of connectors swiftly and reliably even in the situation above.

As compared with a second connector section made up of second connector 51 and second terminal 52, a first connector section made up of first connector 41 and first terminal 42 has a smaller floating amount in a plane intersecting with the insertion and extraction direction of the connector sections. The insertion and extraction direction of the connector sections is a direction along which controller 13 provided with the terminals moves when the terminals are inserted into the connectors or when the terminals are extracted from the connectors. The insertion and extraction direction of the connector sections is hereinafter referred to as insertion and extraction direction Y.

The first connector section can have floating allowance (mobility) in a plane intersecting with insertion and extraction direction Y if a diameter of a through hole in first connector 41 into which screw 43 is inserted is designed to be larger than a shaft diameter of screw 43 for fixing first connector 41 to main wall 31, for example. Alternatively, such floating allowance can be provided if a diameter of a through hole in second terminal 52 into which screw 44 is inserted is designed to be larger than a shaft diameter of screw 44 for fixing second terminal 52 to side surface 15 or if the connector structure has both of the structures.

The first connector section has an above-described floating amount of approximately 3 mm at maximum, for example, in each of the vertical and lateral directions. Although the second connector section can have a floating structure similar to that of the first connector section, the second connector section has an above-described floating amount of approximately 1 mm at maximum, for example, in each of the vertical and lateral directions. The second connector section is smaller in size than the first connector section. In general, it is difficult to increase the floating amount of a small-size connector. Thus, the first connector section is larger than the second connector section in terms of the floating amount.

Second connector unit 50 has locating pin 61 disposed on connector panel 30 and insertion hole 62 for locating pin 61, insertion hole 62 being formed in side surface 15 of controller 13. Locating pin 61 extends toward side surface 15 longer (more greatly) than second connector 51 does (refer to FIG. 5 described later). In connector structure 1, first connector 41 and first terminal 42 (the first connector section), and second connector 51 and second terminal 52 (the second connector section) are brought into a connectible state when locating pin 61 is inserted into insertion hole 62. Connector structure 1 allows a plurality of connector sections to be each connected without work for proper alignment of the connector sections as long as locating pin 61 can be inserted into insertion hole 62 by proper alignment as described above.

Preferably, a connector unit having a connector section with a smaller floating amount is provided with locating pin 61 and insertion hole 62. Thus, in the present exemplary embodiment, second connector unit 50 is provided with locating pin 61 and insertion hole 62. The locating pin may be disposed on controller 13, and the insertion hole may be formed in connector panel 30.

Figure 5:
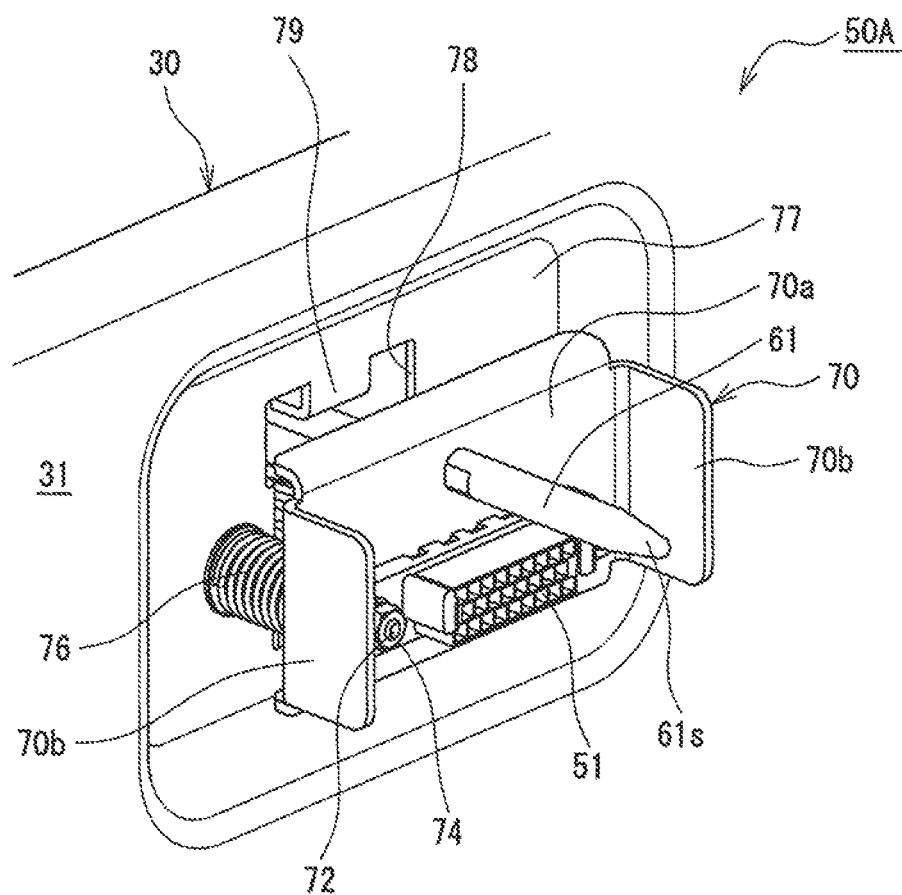
FIG. 5 is a perspective view of a panel-side second connector unit as viewed from front of a power storage device, according to an example of an exemplary embodiment.
Figure 6:
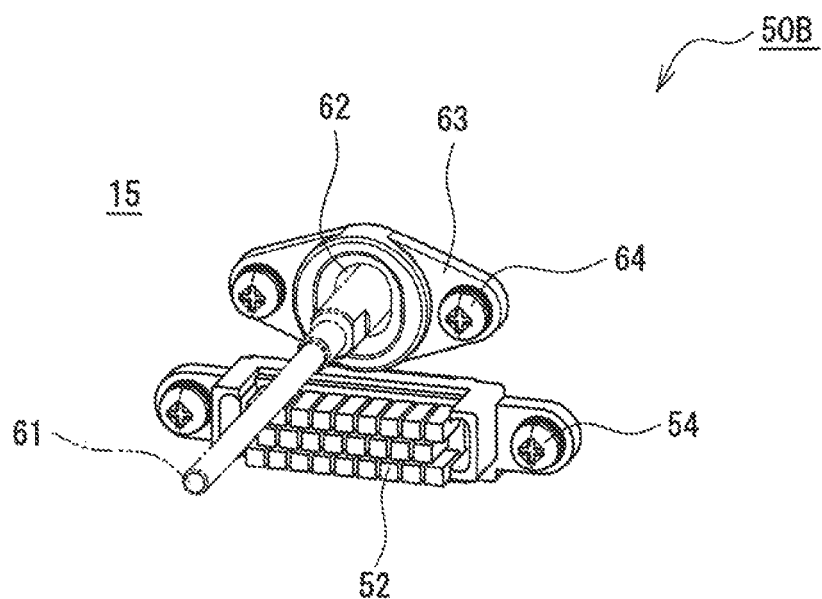
FIG. 6 is a perspective view of a controller-side second connector unit as viewed from behind a power storage device, according to an example of an exemplary embodiment.

With reference to FIGS. 5 and 6, second connector unit 50 will now be described in more detail. FIG. 5 is a perspective view of panel-side second connector unit 50A (hereinafter referred to as "second connector unit 50A") disposed adjacent to connector panel 30 as viewed from front of power storage device 10. FIG. 6 is a perspective view of controller-side second connector unit 50B (hereinafter referred to as "second connector unit 50B") disposed adjacent to controller 13 as viewed from behind power storage device 10.

As illustrated in FIGS. 3 to 6, locating pin 61 is a long elongated pin extending in insertion and extraction direction Y and is inserted into insertion hole 62 with the connector sections each connected. Naturally, locating pin 61 is inserted into insertion hole 62 before the connector sections are each connected. In connector structure 1, locating pin 61, insertion hole 62, the connectors, and the terminals are disposed such that these components reach any of the positions above. In other words, main wall 31 of connector panel 30 and side surface 15 of controller 13 that are substantially parallel to each other have locating pin 61 and insertion hole 62, first connector 41 and first terminal 42, and second connector 51 and second terminal 52, respectively, that are pairs each disposed face-to-face.

Locating pin 61 is fixed to base 70 that is supported over main wall 31 of connector panel 30 by support pin 72. Base 70 has stopper 70b that comes into contact with side surface 15 of controller 13 when second connector 51 and second terminal 52 engage with each other. Locating pin 61 extends toward side surface 15 more greatly than stopper 70b does. Thus, while stopper 70b is in contact with side surface 15, locating pin 61 is inserted into insertion hole 62.

Insertion hole 62 is, as described above, a hole formed in side surface 15 of case 14 of controller 13. Insertion hole 62 may be any hole into which locating pin 61 can be inserted, and may be a through hole passing through side surface 15 or a recess formed in side surface 15 by presswork applied from a region of main wall 31. A depth of insertion hole 62, i.e. a length of the hole along insertion and extraction direction Y, is a length that prevents locating pin 61 from coming into contact with an innermost part of the insertion hole when the connectors engage with the terminals and stopper 70b is brought into contact with side surface 15.

As illustrated in FIG. 5, second connector unit 50A is provided with base 70 and support pin 72 that supports base 70. Base 70 is, as described above, a component to which second connector 51 and locating pin 61 are fixed, and is formed of a metallic plate, for example. Support pin 72 supports base 70 such that base 70 is movable relative to main wall 31 of connector panel 30 along insertion and extraction direction Y. Second connector 51 and locating pin 61 that are fixed to base 70 move together with base 70 along insertion and extraction direction Y.

Preferably, base 70 is supported by two support pins 72. Two support pins 72 pass through main wall 31 and are attached to main wall 31 such that the pins are slidable relative to the main wall along insertion and extraction direction Y. Second connector unit 50A has spring 76 to press base 70 toward side surface 15 of controller 13. Springs 76 are attached to two respective support pins 72.

Base 70 includes base body 70a to which second connector 51 and locating pin 61 are fixed and stoppers 70b extending from both lateral ends of base body 70a toward controller 13 along insertion and extraction direction Y. Stoppers 70b are, for example, formed by bending a metallic plate constituting base 70 such that the bent portions extend slightly further toward controller 13 than second connector 51 does. When the second connector section engages together, stoppers 70b come into contact with side surface 15 to prevent force greater than necessary from being applied to the second connector section. In the present exemplary embodiment, locating pin 61 extends toward controller 13 more greatly than each stopper 70b does and hence stoppers 70b do not inhibit the insertion of the pin into insertion hole 62.

Base body 70a is formed in a plate shape that is long in the lateral direction and supported by two support pins 72 so as to be substantially parallel with main wall 31 of connector panel 30. In the present exemplary embodiment, locating pin 61, as described later, contributes to securely supporting base body 70a in parallel with the main wall. Base body 70a has a through hole into which second connector 51 is fitted, through holes into which support pins 72 are inserted, and a through hole into which locating pin 61 is inserted, for example.

In the example shown in FIG. 5, support pin 72 passing through base body 70a has a tip portion adjacent to controller 13. Nut 74 is fastened on the tip and thereby each support pin 72 is fixed to base body 70a. The tip portion of support pin 72 has a thread. The tip portions of support pins 72 are inserted into through holes formed in both ends of second connector 51 in the lateral direction. Nuts 74 are fastened such that second connector 51 is pressed. Second connector 51 is thereby fixed to base body 70a using support pins 72.

Two support pins 72 are supported on main wall 31 through respective support parts 73 (refer to FIG. 4). Support parts 73 are disposed around through holes formed in main wall 31 and support support pins 72 such that support pins 72 are slidable in insertion and extraction direction Y. A ring-shaped part is, for example, attached to a rear tip portion of support pin 72. This structure prevents support pins 72 from coming off support parts 73.

Springs 76 attached to support pins 72 are disposed between main wall 31 and base 70 and press base 70 toward controller 13. Base 70 supported by support pins 72, which are configured to slide along insertion and extraction direction Y, is movable in insertion and extraction direction Y and is pressed by springs 76 toward controller 13. Thus, base 70 can accommodate a misalignment of each connector section in insertion and extraction direction Y. In other words, because of the structure of second connector unit 50A, connector structure 1 ensures a floating amount for each connector section to a certain extent in insertion and extraction direction Y.

In the example shown in FIG. 5, a part of main wall 31 facing base 70 has recess 77 that is depressed rearward. Recess 77 has opening 78 described above and the through holes through which support pins 72 pass. Fan cable 36 is inserted into opening 78 and is connected to second connector 51. Recess 77, for example, acts as a space to accommodate spring 76 that is compressed when the connector sections each engage together.

Preferably, locating pin 61 is disposed close to second connector 51. Locating pin 61 may be disposed alongside second connector 51 in the lateral direction with provision that locating pin 61 is close to second connector 51. However, it is preferred that locating pin 61 is disposed alongside second connector 51 in the vertical direction. In the present exemplary embodiment, second connector 51 is disposed in a lower part of base 70, whereas locating pin 61 is disposed in an upper part of base 70, such that the connector and the pin are alongside of each other in the vertical direction. Locating pin 61 is positioned vertically upward of second connector 51.

Locating pin 61 is disposed substantially perpendicularly on a front surface of base body 70a facing side surface 15 of controller 13 such that locating pin 61 extends from the front surface toward side surface 15. In the example shown in FIG. 5, locating pin 61 is fixed to a lateral middle in the upper part of base body 70a. Support pins 72 fastening second connector 51 are fixed to both lateral ends respectively in the lower part of base body 70a. Locating pin 61 passes through base body 70a to extend to main wall 31 and is inserted into opening 78 formed in main wall 31.

A portion of locating pin 61 beyond the front surface of base body 70a is, for example, thicker than a diameter of the through hole through which the pin is inserted. Meanwhile, another portion of locating pin 61 behind a rear surface of base body 70a is thinner than the diameter of the through hole. The portion of locating pin 61 behind the rear surface of base body 70a has a thread. A nut is fastened on the thread behind the rear surface and locating pin 61 is thereby fixed to base body 70a. The portion of locating pin 61 extending from the rear surface of base body 70a toward main wall 31 is substantially identical in length to support pin 72, for example, such that locating pin 61 extends rearward of main wall 31 through opening 78 even if spring 76 is stretched.

Locating pin 61 inserted into opening 78 is in contact with an upper edge of opening 78. The upper edge presses locating pin 61 slidable along insertion and extraction direction Y to prevent the pin from rising. Main wall 31 may have flange 79 extending rearward from the upper edge of opening 78 along insertion and extraction direction Y. In this case, locating pin 61 inserted into opening 78 is in contact with flange 79, and flange 79 presses locating pin 61 from above to prevent the pin from rising. Accordingly, base 70 is supported by two support pins 72 and one locating pin 61 at three points such that base body 70a is substantially parallel with main wall 31.

Locating pin 61 has a tapered shape in which a diameter of the pin becomes smaller with decreasing distance from a tip of locating pin 61 adjacent to controller 13. Tip portion 61s of locating pin 61 adjacent to controller 13 is formed into a substantially cone shape that gradually decreases in diameter such that the tip is located at a center of the pin. Tip portion 61s having such a tapered shape produces a centering effect after tip portion 61s is inserted into insertion hole 62. This configuration facilitates proper alignment of the connector sections.

As illustrated in FIG. 6, second connector unit 50B includes second terminal 52 and insertion hole 62 that are disposed on side surface 15 of controller 13 so as to be alongside of each other in the vertical direction. As described above, second terminal 52 is fixed to side surface 15 with screws 54. Second terminal 52 has a floating structure that provides a floating amount of approximately 1 mm in a plane intersecting with insertion and extraction direction Y, for example.

A through hole formed in side surface 15 may be used as insertion hole. In the present exemplary embodiment, however, insertion hole 62 is formed in receiver 63 attached to a periphery of the through hole. Receiver 63 is fixed to side surface 15 with screws 64. Insertion hole 62 formed in receiver 63 is an elongated hole that is long in the vertical direction. Insertion hole 62 may be a hole having the shape of a perfect circle. However, it is preferable that the insertion hole 62 is an elongated hole in consideration of a misalignment between locating pin 61 and insertion hole 62.

In the present exemplary embodiment, one set of locating pin 61 and insertion hole 62 is provided. However, two or more sets of locating pins 61 and insertion holes 62 may be provided. A number of the connector sections may be three or more other than the two shown in this example.

Figure 7A:
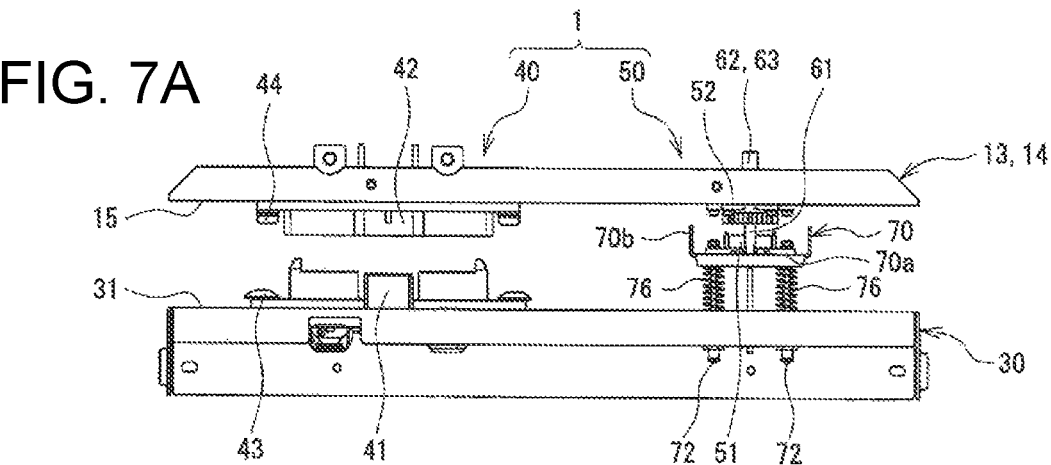
FIGS. 7A to 7C are plan views of a connector structure according to an example of an exemplary embodiment, illustrating a method for connecting connectors on a connector panel to terminals on a controller.
Figure 7B:
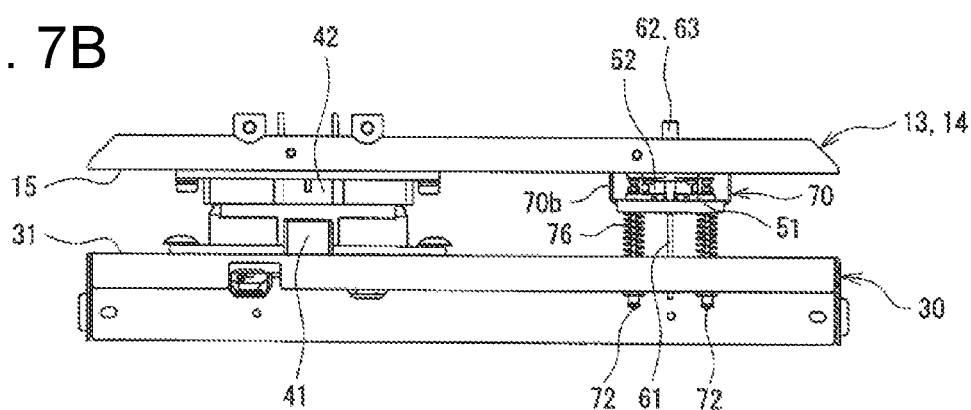
Figure 7C:
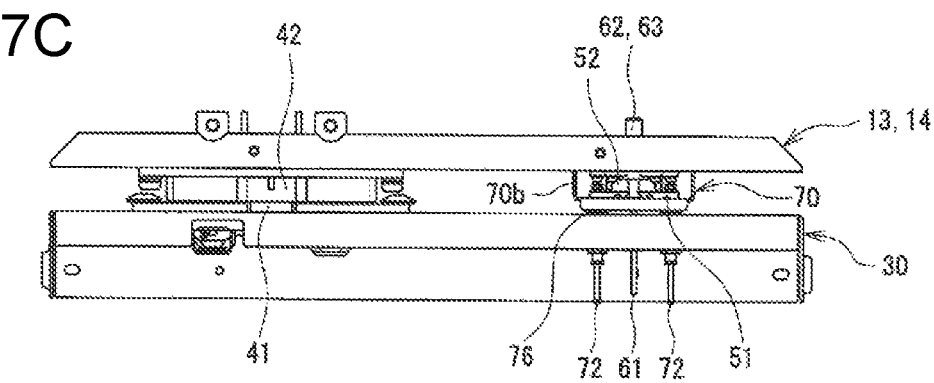

With reference to FIGS. 7A to 7C, a method of connection for connector structure 1 having the configuration described above will now be described. FIGS. 7A to 7C are plan views of connector structure 1 and illustrate a connecting procedure.

First, as shown in FIG. 7A, controller 13 is inserted into rack 16 such that side surface 15 of case 14 of controller 13 provided with first and second terminals 42 and 52 faces main wall 31 of connector panel 30 and is substantially parallel with main wall 31. Controller 13 is placed on base panel 37 to which connector panel 30 is fixed. Insertion hole 62 is an elongated hole that is long in the vertical direction and hence facilitates proper alignment of locating pin 61 with insertion hole 62 in the vertical direction. In other words, connector structure 1 provides proper alignment as long as efforts are focused on alignment in the lateral direction.

Side surface 15 of controller 13 is brought close to connector panel 30 such that locating pin 61 fixed to base body 70a of base 70 is inserted into insertion hole 62 formed in side surface 15 of controller 13, with efforts for proper alignment focused especially on that in the lateral direction. When locating pin 61 is inserted into insertion hole 62 as shown in FIG. 7A, proper alignment of the connector sections is automatically completed. Thus, with locating pin 61 inserted into insertion hole 62, controller 13 is moved toward connector panel 30 along insertion and extraction direction Y so that the connector sections are each connected as shown in FIGS. 7B and 7C.

In connector structure 1, as shown in FIGS. 7B and 7C, second connector 51 and second terminal 52 of second connector unit 50 are connected, and subsequently first connector 41 and first terminal 42 of first connector unit 40 are connected. This structure allows the connector sections to be each connected smoothly because the second connector section with a smaller floating amount in a plane intersecting with insertion and extraction direction Y is connected first. When the first connector section is connected, locating pin 61 is inserted deep into insertion hole 62 and stoppers 70b of base 70 are brought into contact with side surface 15.

With the first connector section connected, controller 13 is brought close to connector panel 30 such that springs 76 are compressed and base 70 moves toward main wall 31. Since proper alignment of the first connector section is completed, the first connector section will be connected if controller 13 is moved further along insertion and extraction direction Y. Connector structure 1 configured as described above enables a plurality of connector sections to be each connected swiftly and reliably even if positions of the connector sections cannot be visually checked.

The invention claimed is:

1. A connector structure configured to electrically connect a connector disposed on a panel with an electric device, the connector structure comprising:
   a first connector unit including a first connector disposed on the panel and a first terminal disposed on a side surface of the electric device facing the panel, the first terminal being configured to be connected with the first connector; and
   a second connector unit including a second connector disposed at a distance from the first connector on the panel and a second terminal disposed at a distance from the first terminal on the side surface of the electric device, the second terminal being configured to be connected with the second connector,
   wherein the second connector unit has a locating pin being disposed on the panel and extending toward the side surface of the electric device longer than the second connector does and an insertion hole for the locating pin, the insertion hole being formed in the side surface of the electric device, and
   the first connector and the first terminal, and the second connector and the second terminal are brought into a connectible state when the locating pin is inserted into the insertion hole, and
   wherein the second connector unit further includes:
   a base to which the second connector and the locating pin are fixed;

a support pin to support the base in such a way that the base is movable relative to the panel along the insertion and extraction direction; and a spring to press the base toward the side surface of the electric device.

2. The connector structure according to claim 1, wherein, as compared with a second connector section made up of the second connector and the second terminal, a first connector section made up of the first connector and the first terminal has a smaller floating amount in a plane intersecting with an insertion and extraction direction of the connector sections.

3. The connector structure according to claim 1, wherein the second connector unit further includes:

an opening formed in the panel; and a flange extending from an upper edge of the opening along the insertion and extraction direction, and the locating pin passes through the base and is inserted into the opening so as to come into contact with the flange.

4. The connector structure according to claim 3, wherein a plurality of the support pins are fixed to near both lateral ends respectively in a lower part of the base, and the locating pin is fixed to a lateral middle in an upper part of the base.

5. The connector structure according to claim 1, wherein the locating pin has a tapered shape in which a diameter of the locating pin becomes smaller with decreasing distance from a tip of the locating pin.

6. The connector structure according to claim 1, wherein the insertion hole is an elongated hole that is long in a vertical direction.

7. A power storage device having the connector structure according to claim 1.

8. The power storage device according to claim 7, comprising:

a plurality of battery modules;

a fan to cool the battery modules;

a controller to control the battery modules and the fan; and the panel on which the first connector and the second connector are disposed, wherein electric cables connected to the battery modules and the fan are connected to the respective connectors on the panel, and the connector structure electrically connects the connectors on the panel with the controller.

9. The power storage device according to claim 7, comprising:

a plurality of battery modules; and the panel on which the first connector and the second connector are disposed, wherein the connector structure electrically connects the connectors on the panel with the battery modules.

10. The power storage device according to claim 8, further comprising a rack to contain and arrange the plurality of the battery modules, wherein the panel is fixed to the rack.

11. The power storage device according to claim 10, wherein the panel is fixed to the rack in such a way that electric cables connected to the connectors extend toward a rear of the rack.

12. A power storage device having the connector structure according to claim 1.

13. A power storage device having the connector structure according to claim 3.

14. A power storage device having the connector structure according to claim 4.

* * * * *